United States Patent [19]
Ishii

[11] Patent Number: 5,478,202
[45] Date of Patent: Dec. 26, 1995

[54] CASE SEPARATING APPARATUS

[76] Inventor: Toru Ishii, 7-43, 1-chome, Kukodori, Matsuyama-shi, Ehime-Pref., Japan

[21] Appl. No.: 206,589

[22] Filed: Mar. 7, 1994

[51] Int. Cl.⁶ .................................................. B65G 59/06
[52] U.S. Cl. .................................. 414/797.5; 414/795.9; 414/798.1
[58] Field of Search ................................ 414/795.6, 795.9, 414/797.4, 797.5, 798, 798.1

[56] References Cited

U.S. PATENT DOCUMENTS

| | | | |
|---|---|---|---|
| 2,629,503 | 2/1953 | Neja | 414/798 |
| 2,858,043 | 10/1958 | Fenton et al. | 414/797.4 |
| 3,096,891 | 7/1963 | Verrinder et al. | 414/798 |
| 4,013,179 | 3/1977 | Fluck | 414/798 |
| 4,809,881 | 3/1989 | Becker | 414/798.1 |
| 4,865,515 | 9/1989 | Dorner et al. | 414/797.5 |

FOREIGN PATENT DOCUMENTS

| | | | |
|---|---|---|---|
| 2224498 | 5/1990 | United Kingdom | 414/798.1 |

Primary Examiner—David A. Bucci
Assistant Examiner—Gregory A. Morse
Attorney, Agent, or Firm—Moonray Kojima

[57] ABSTRACT

In a case separating apparatus, wherein groups of cases arranged in rows on a carrying conveyor and supported by a supporting device, are moved to an unloading device where a row of groups of cases are unloaded onto a separating apparatus where the bottom-most cases of each row are separated from the remaining cases in the groups, the improvement wherein an elevating conveyor is provided in the separating apparatus with a device for slowing the speed of vertical movement of the elevating conveyor at the positions where the groups of cases are held and where the separation occurs and for accelerating the speed of the elevating conveyor in between the two positions, whereby the impact and noise of holding and separating of the case from the group of cases are reduced.

5 Claims, 16 Drawing Sheets

CASE SEPARATING APPARATUS

BACKGROUND OF THE INVENTION

1. Field of Invention

This invention relates to a case separating apparatus for separating a group of cases, e.g. comprising cases of containers made of synthetic resin, carrying cases of corrugated carton, or the like, wherein the cases are stacked in plural layers and arranged in rows.

2. Description of Related Art

As an example of a conventional cases separating apparatus for separating individual cases from a plurality of cases stacked in groups of cases layer by layer, there is an apparatus wherein a pallet mounting groups of cases arranged in plural rows is intermittently forwarded to an unloading position on a carrying conveyor, and groups of plural rows mounted on the pallet are moved row by row onto an elevating conveyor. When the elevating conveyor is vertically moved up and down by an air cylinder, the groups of the remaining upper layer stacked on the elevating conveyor,except the cases in the bottom layer, are held in an upright position by right and left support arms, while the cases of the bottom layer stacked on the elevating conveyor are separated and mounted on a distributing conveyor.

In this method, however, when the elevating conveyor is moved vertically up and down by the air cylinder, when separating each case of the bottom layer, after holding the cases stacked on the second layer from the bottom on the elevating conveyor by right and left support arms, the elevating conveyor mounting the cases of the bottom layer is vertically lowered to the descending position, and hence the cases mounted on the elevating conveyor are moved about due to the shock of descending and stopping, and noise is caused by the momentary contacting and departing action of the elevating conveyor with the cases.

When separating the cases in the second layer, since the elevating conveyor is vertically raised at once to the ascending position to lift the remaining case groups held by the right and left support arms swiftly by the elevating conveyor, the cases of the bottom layer held by the support arms and the elevating conveyor collide, and a large noise is caused by the impact of the collision. If the impact occurring at the time of the ascending and stopping and descending and stopping is large, the contents in the cases may be bruised or damaged, and the commercial value of the contents may be spoiled.

Besides, when cases containing a multiplicity of products are stacked in plural layers, the center of gravity of the case group is raised, and the stacking position of the case group becomes unstable, and hence when driving or stopping the carrying conveyor, the group of the final row stacked on the pallet may collapse, and unloading may not be done smoothly.

Since the pusher plate is moved reciprocally at a constant speed, the pusher plate may momentarily collide against each case group of one row stacked on the pallet, and a large noise is caused by the impact of mutual collision. If the impact of collision is significant, the commercial value of the products in the cases may be spoiled.

On the other hand, when the moving speed of the pusher is lowered, it takes a long time to move reciprocally, and it requires more time and labor in unloading the groups of one row, and the working efficiency is poor. When the moving speed of the pusher plate is increased, the groups of cases may tumble due to inertia when unloading, or it may be difficult to stop each group of cases of one row at a predetermined position.

Still more, when the stopping position of the cases mounted on the elevating conveyor is deviated or reinforcing ribs are projecting to both sides of the case, it may be difficult to stop the right and left case holding plates at both side edges of the case, or when separating vertically, the group of cases on the upper side may drop or tumble by gravity.

SUMMARY OF THE INVENTION

It is hence a first object of the invention to provide a case separating apparatus capable of reducing noise and impact occurring at the time of separating and of stabilizing the separating work, by slowing down the ascending and descending speed of the elevating conveyor just before reaching the case holding position and case separating position.

It is a second object to provide a case separating apparatus capable of securely preventing tumbling of the group of cases when unloading, so as to unload smoothly, by moving each group of cases of the final row stacked on the pallet in a state of held in upright position by case support plates.

It is a third object to provide a case separating apparatus capable of reducing noise and impact caused at the time of unloading, and of preventing loss of commercial value of the products contained in the cases, by slowing down the moving speed of the pusher plate at the unloading start position and unloading end position.

It is a fourth object to provide a case separating apparatus capable of holding the cases securely and of performing the separating job mechanically, by independently stopping each case holding claw of right and left sides at both side edges of the case mounted on the elevating conveyor.

DESCRIPTION OF THE PREFERRED EMBODIMENTS

Figure 1:
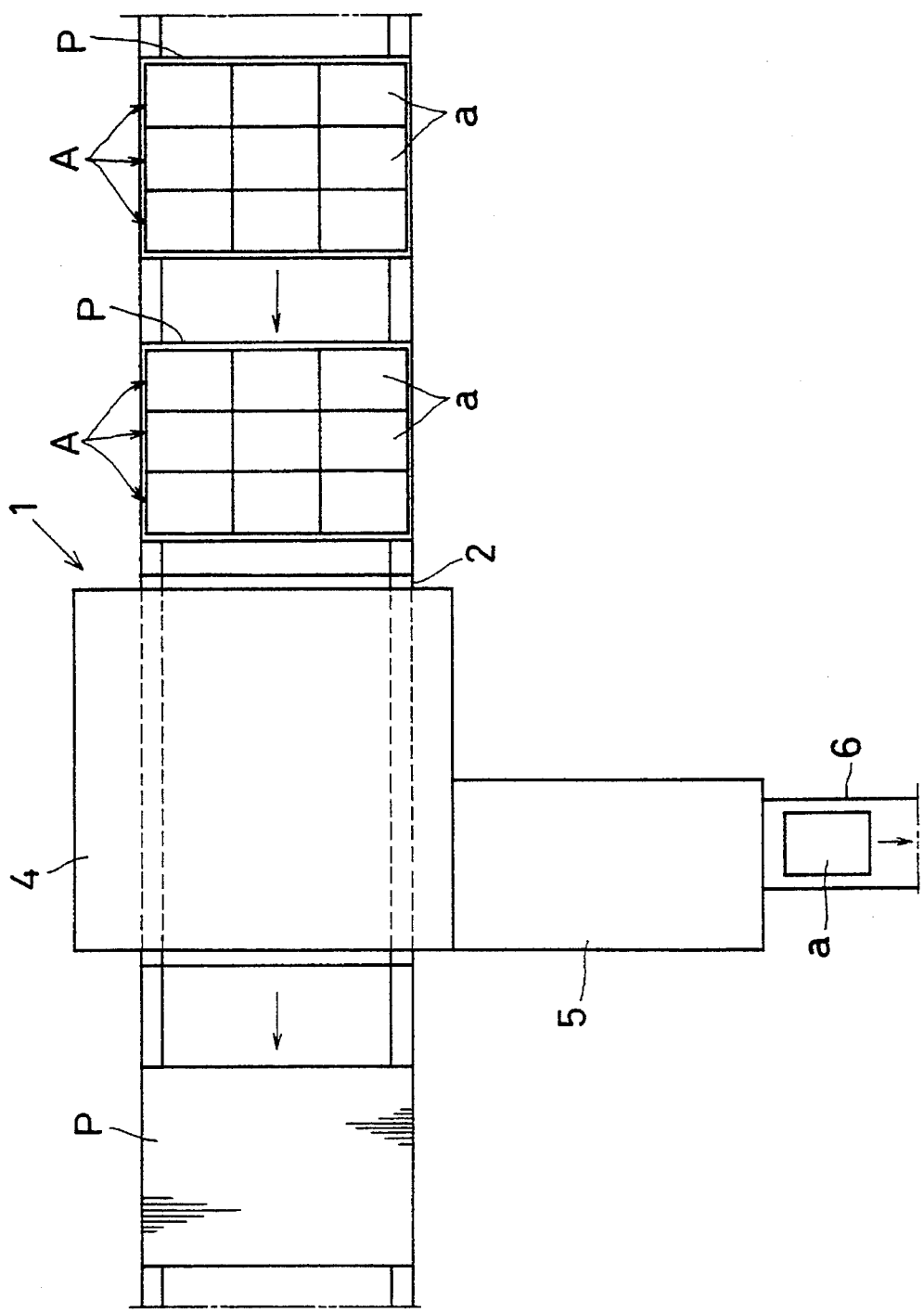
FIG. 1 is a general structural diagram showing a case separating apparatus of a first illustrative embodiment.
Figure 2:
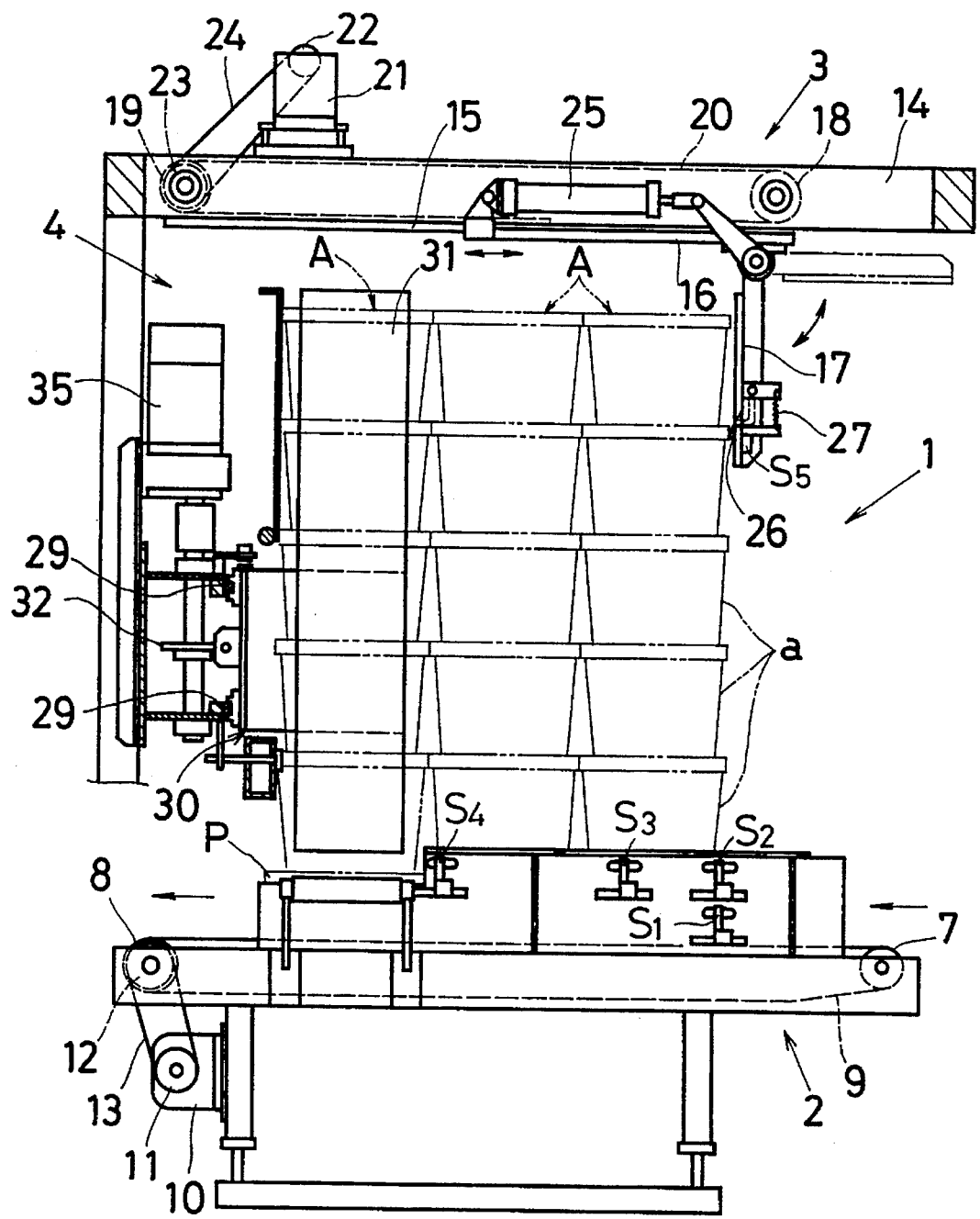
FIG. 2 is a side view showing a case supporting machine and a case unloading machine.

As shown in FIG. 1, the cases are arranged on pallet P in rows (vertical direction in the drawing) and in columns (horizontal direction in the drawing). FIG. 1 shows the top view of a plurality of piles, which are called groups herein. FIG. 2 shows each group (or pile) comprising a plurality of cases piled on top of each other, that is in layers 5 in this case.

Figure 7:
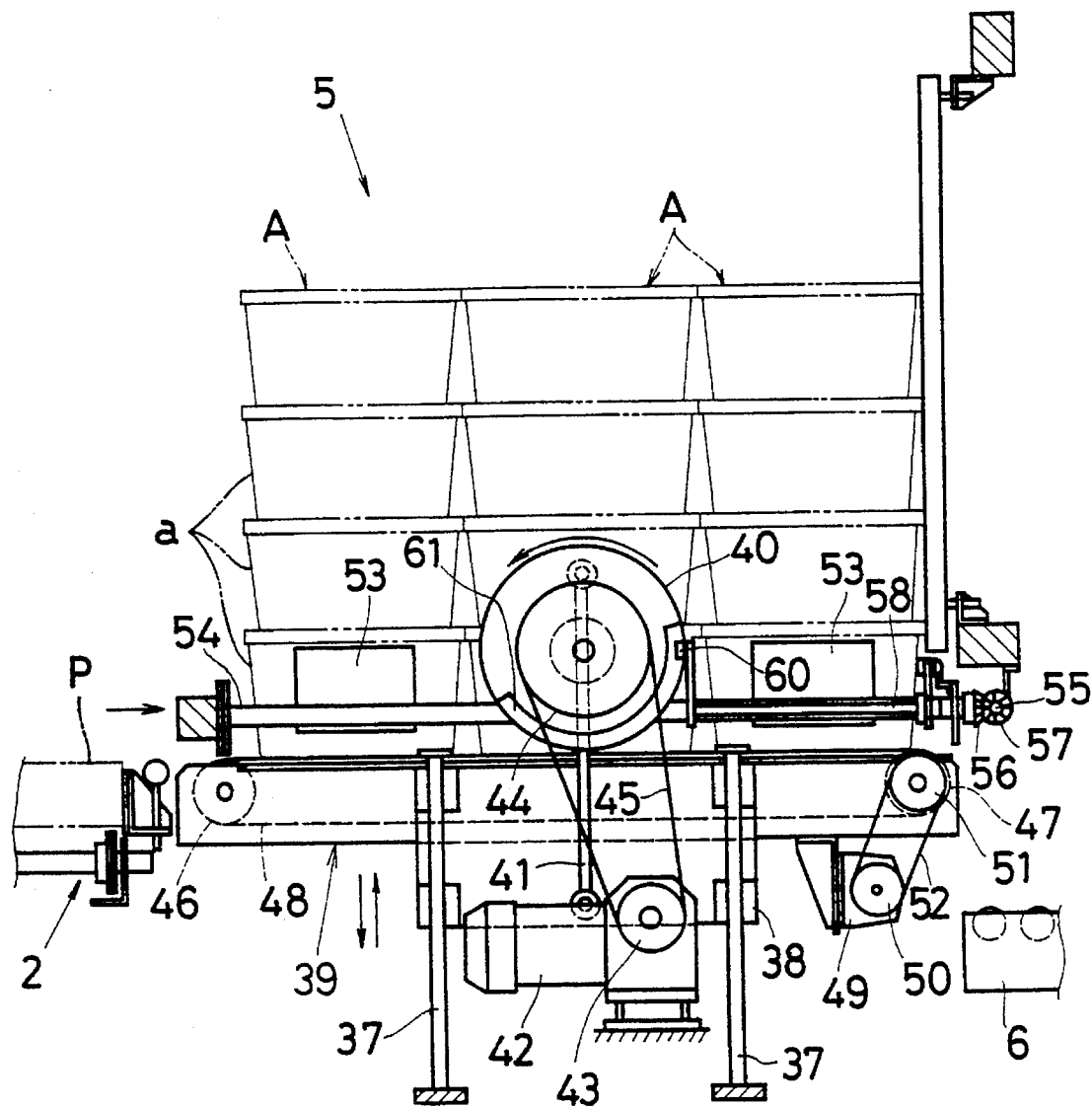
FIG. 7 is a side view showing the conveyor ascending stop state of the case separating machine.

The drawings show a case separating apparatus of a first illustrative embodiment used for separating cases, e.g. made of synthetic resin and formed in a nesting arrangement layer by layer. In FIGS. 1, 2 and 7, this case separating apparatus 1 comprises a carrying conveyor 2 for conveying a pallet P having stacked thereon, for example, 45 cases a, to an unloading position, a case supporting machine 3 for supporting each group of cases A stacked on the pallet P in upright position, a case unloading machine 4 for unloading each group A stacked on the pallet P layer by layer, a case separating machine 5 for separating each group A of one row sequentially from the lower layer and a distributing conveyor 6 for conveying and supplying each case a of the bottom layer to the next step.

The carrying conveyor 2 has feed chains 9,9 mounted, as shown in FIG. 2, between sprockets 7,7 positioned at the feed start end (right in FIGS. 1,2) and sprockets 8,8 positioned at feed finish end (left in FIGS. 1,2) and is designed to convey the pallet P placed between the feed chains 9,9 (there are two feed chains) in the pallet feed direction (see arrow in FIGS. 1,2) by moving feed chains 9,9 in the pallet feed direction, through turning of sprockets 11,12 and a drive chain 13 using the driving force of a feed motor 10 with reduction gear. As shown, motor 10, gears, sprocket 11 and belt 13 are disposed beneath the finish end, i.e. left in FIGS. 1,2.

Moreover, a photo sensor S1 is disposed at the unloading position set on the carrying conveyor 2, opposite to pallet P, while photosensors S2,S3, S4 are disposed opposite to each row of groups A stacked on pallet P. According to the detection by photosensors S1,S2,S3,S4, feed motor 10 and moving motor 21 and swivel cylinder 25 of the case supporting machine 3 (discussed in detail hereinbelow) are driven and stopped, thereby driving intermittently the apparatus when unloading groups A of plural row stacked on pallet P or driving continuously the apparatus when feeding or discharging the pallet P.

Figure 3:
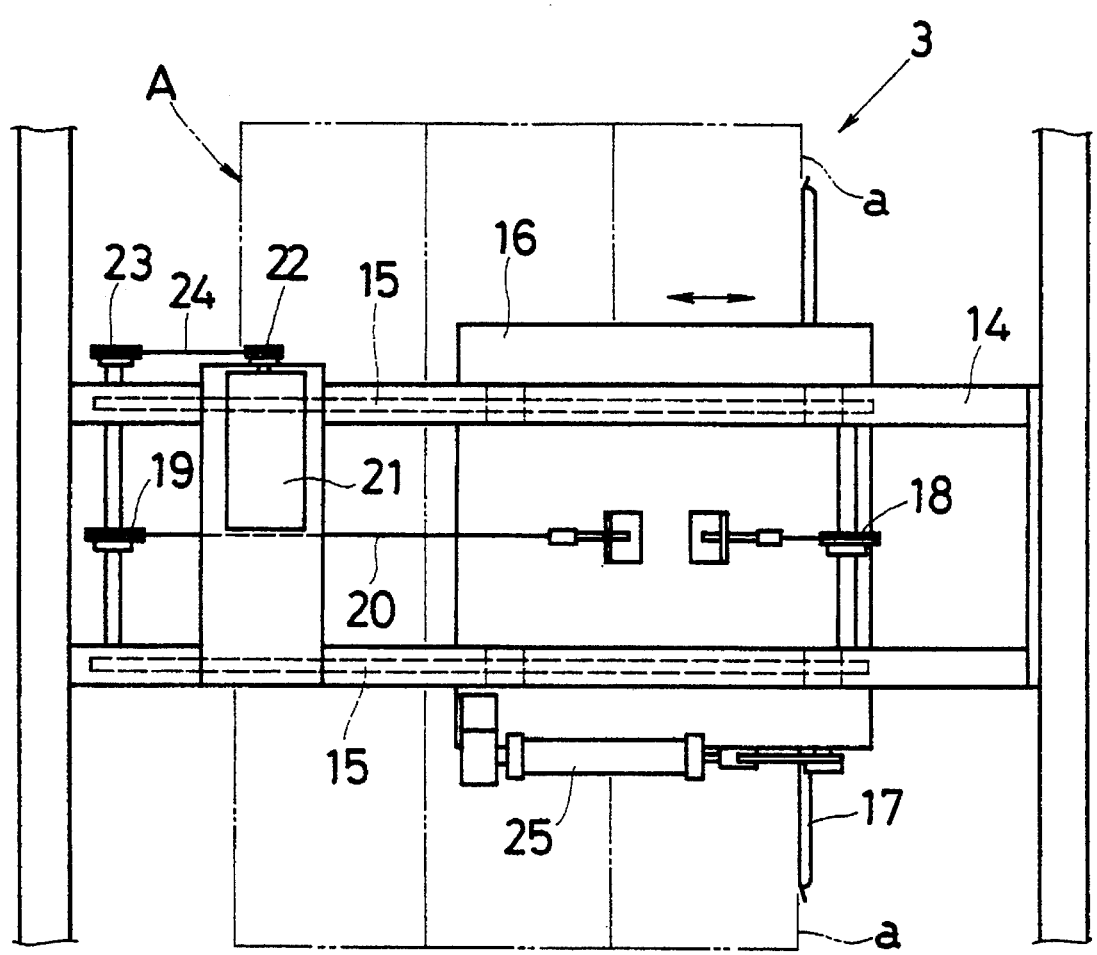
FIG. 3 is a plan view showing the case supporting state by the case supporting machine.
Figure 4:
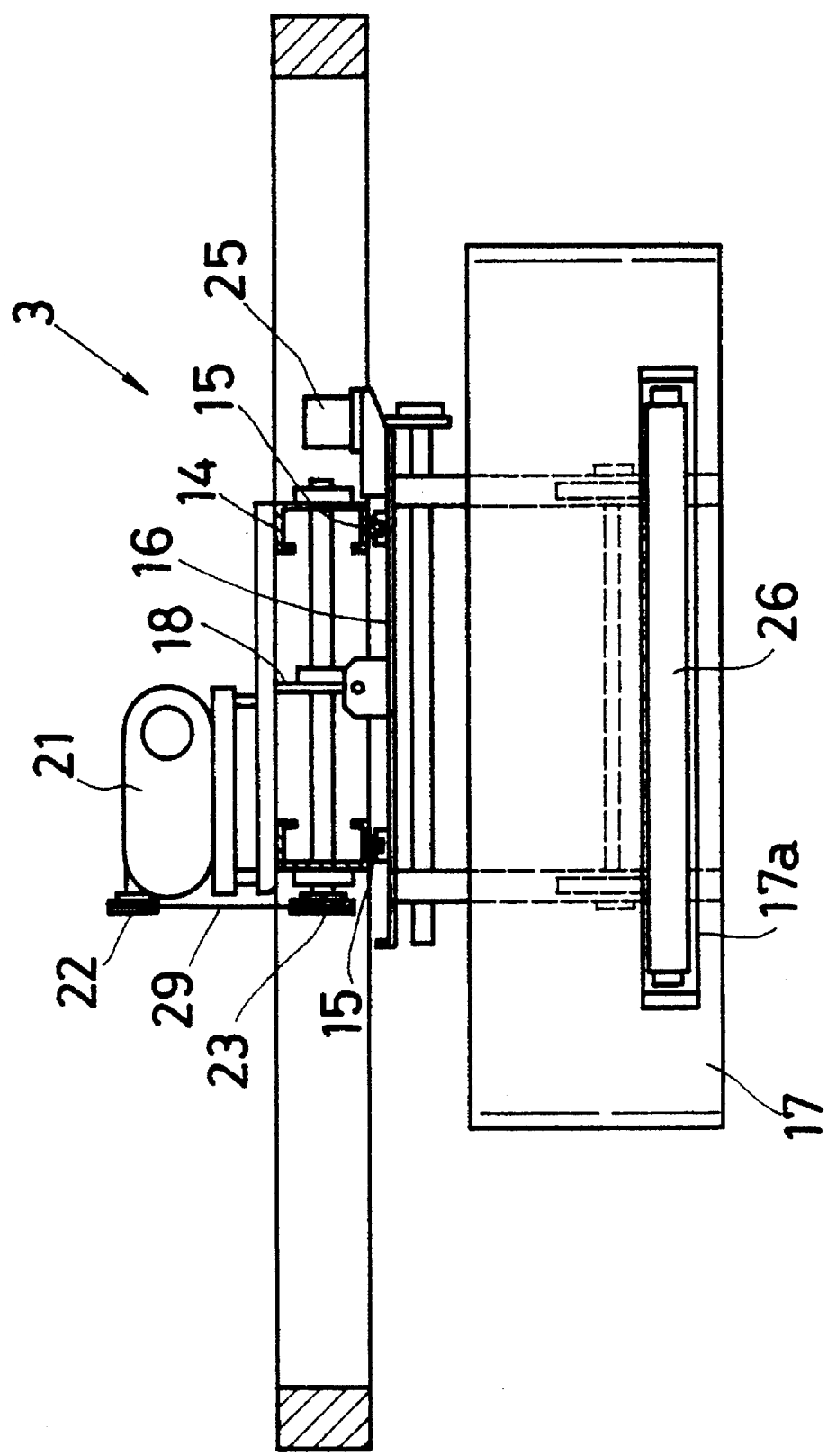
FIG. 4 is a front view showing a drooping state of the case supporting plate.

In the case supporting machine 3, as shown in FIG. 3 and FIG. 4, mounting frame 14 is disposed horizontally parallel to the pallet feed direction (see double arrow) in the unloading position above carrying conveyor 2, and a movable table 16 installed movably in the longitudinal direction between two guide rails 15,15 installed at the lower side of the mounting frame 14, and a slender case supporting plate 17 rotatable (see FIG. 1) in the vertical direction and disposed at the lower rear end of movable table 16.

A moving chain 20 is stretched between a sprocket 18 positioned at the feed start end (right in FIG. 3) of the mounting frame 14, and a sprocket 19 positioned at the feed rear end (left in FIG. 3) and the end portion of the moving chain 20 is fixed to the middle of the upper side of moving table 16 and driven by the driving force of moving motor 21. A reduction gear is used with motor 21 and both are disposed at the rear end upper part (see FIG. 2). The moving chain 20 is turned in the pallet feed direction through sprockets 22, 23 and drive chain 24, and in synchronism with the intermittent feed of the carrying conveyor 2. The case supporting plate 17 is rotated intermittently to a closed state at a specific gap to the groups A of the third row stacked on pallet P.

The case supporting plate 17 (see FIG. 2) has a piston rod of a swivel cylinder 25 disposed in the upper part at one side of the movable table 16 which is linked to the shaft end of the case supporting plate 17. The plate 17 is operated by cylinder 25 to rotate vertically between a vertical position confronting the feed side rear portion of groups A stacked on pallet P, and a horizontal position which allows groups A to pass.

A pressure plate 26 is positioned so as to be free to come in and out of an access hole 17a formed in the lower end of the front side of the case supporting plate 17, and a spring 27 is stretched between lower rear end of the case supporting plate 17 and the rear shaft end of the pressure plate 26. The pressure plate 26 is rotated and thrust in a projecting direction with respect to the access hole 17a of the case supporting plate 17, while a pressure sensor S5, such as a limit switch, is disposed opposite to the the pressure plate 26 at the lower rear end of the case supporting plate 17. It is detected by the pressure sensor S5 when the pressure plate 26 contacts each group A of the third row stacked on pallet P. Motor 21 is driven and stopped by the detection of the pressure sensor S5,so that the case supporting plate 17 is moved and stopped at a position close to the specific gap to each group A of the third row stacked on pallet P.

Figure 5:
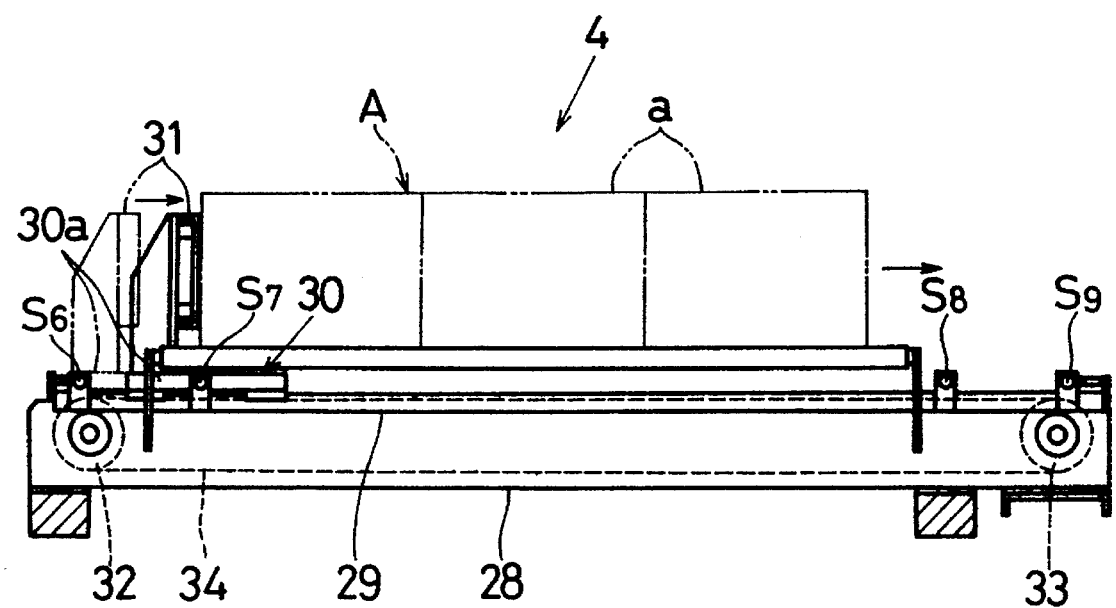
FIG. 5 is a plan view showing the state immediately after start of case unloading by the case unloading machine.

The case unloading machine 4, as shown in FIGS. 4 and 5, horizontally supports a mounting frame 28 orthogonally to the pallet feeding direction in the unloading position and is set on the carrying conveyor 2. A movable table 30 is provided movably in the lateral direction between two guide rails 29,29 horizontally mounted at the front side of mounting frame 28. A pusher plate 31 of a longitudinal shape is fixed to the middle part of the front side of the movable table 30.

In addition, a moving chain 34 is stretched between a sprocket 32 positioned at the unloading start end (left in FIG. 5) of the mounting frame 28, and a sprocket 33 positioned at the unloading finish edn (right in FIG. 5). The end portion of the moving chain 34 is fixed to the middle part of the rear of the movable table 30. A moving motor 35 (see FIG. 2) and reduction gear are disposed in the rear. The motor 35 is directly coupled to sprocket 33 and drives moving chain 34 in the unloading direction. The pusher plate 31 is moved longitudinally between the backward position confronting the groups A of one row stacked on pallet P, and the forward position for transferring the groups A of one row onto the elevating conveyor 39 of the case separating machine (to be discussed in further detail hereinbelow) 5.

Moreover, in the start end of the mounting frame 28, photo sensors S6, S7 are disposed opposite to the movable table 30 at the start end (left in FIG. 5) of the mounting frame 28, while photo sensors S8,S9 are disposed opposite to the movable table 30 in the rear end (right in FIG. 5) of the mounting frame 28. The moving motor 35 is driven or stopped according to the detection by the photo sensors S6,S7, S8, S9. That is, when the movable table 30 moves between the photo sensors S6,S7 and the photo sensors S8,S9, the moving motor 35 rotates at a low speed so as to slow down the longitudinal moving speed of the pusher plate 31 in the regions of the backward position and forward position. When the movable table 30 moves between the photo sensors S7, S8, the moving motor 35 rotates at a high speed to accelerate the longitudinal moving speed of the pusher plate 31 in the intermediate region between the forward position and backward position.

The case separating machine 5, as shown in FIGS. 7,8,9 and 10, horizontally supports a mounting frame 36 parallel to the unloading direction in the unloading position on the carrying conveyor 2, and an elevating table 38 is mounted between two guide rails 37,37 vertically positioned at the front side of the mounting frame 36, while an elevating conveyor 39 formed in a size for mounting groups A of one row is horizontally fixed at the front side of the elevating table 38.

The front peripheral edge of a rotary plate 40 borne in the upper end middle of the mounting frame 36, and the rear lower end of the elevating table 38 are coupled through a crank arm 41. By the driving force of an elevating motor 42 (which motor 42 and reduction gear are disposed in the lower part) , the rotary plate 40 is rotated in one direction through sprockets 43,44 and drive chain 45. The rotation of the rotary plate 40 is converted into vertical motion of the elevating table 38 by the crank motion of the crank arm 41. The elevating conveyor 39 is moved up and down and stopped between the case holding position which is horizontal to the pallet P on the carrying conveyor 2 disposed at the upper layer, and the case separating position which is horizontal to the distributing conveyor 6 disposed at the lower side. The speed is reduced when the elevating conveyor 39 moves up and down in the regions of the case holding position and case separating position. The speed is accelerated when the elevating conveyor 39 moves up and down in the intermediate region between the case holding position and the case separating position.

The elevating conveyor 39 stretches feed belts 48,48 (which may be of V-cross section type) between pulleys 46,46 provided at the feed start end and pulleys 47,47 positioned at the feed finish end. By the driving force of a feed motor 49 (which motor 49 and reduction gear are disposed in the finish end) the feed belts 48,48 are moved in the unloading direction through action of sprockets 50, 51 and drive chain 52. The elevating conveyor 39 is rotated and driven until loading action of groups A of one row is over which occurs when the conveyor is stopped in ascending stroke. The elevating conveyor 39 is rotated and driven until unloading action of groups A of one row is over which occurs when the conveyor is stopped in descending stroke.

Still more, support shafts 54,54 are mounted parallel to the case unloading direction at both side positions of the elevating conveyor 39 stopped at the case holding position. The case holding plates 53 are fixed opposite to both side of the cases A stacked in the second layer from the bottom on the elevating conveyor 39. Plates 53 are attached to support shafts 54, 54. One end of the support shafts 54,54 and the right and left ends of an interlocking shaft 55 are mounted on the finish end and are respectively coupled together with bevel gears 56, 57 (see FIG. 7).

Figure 9:
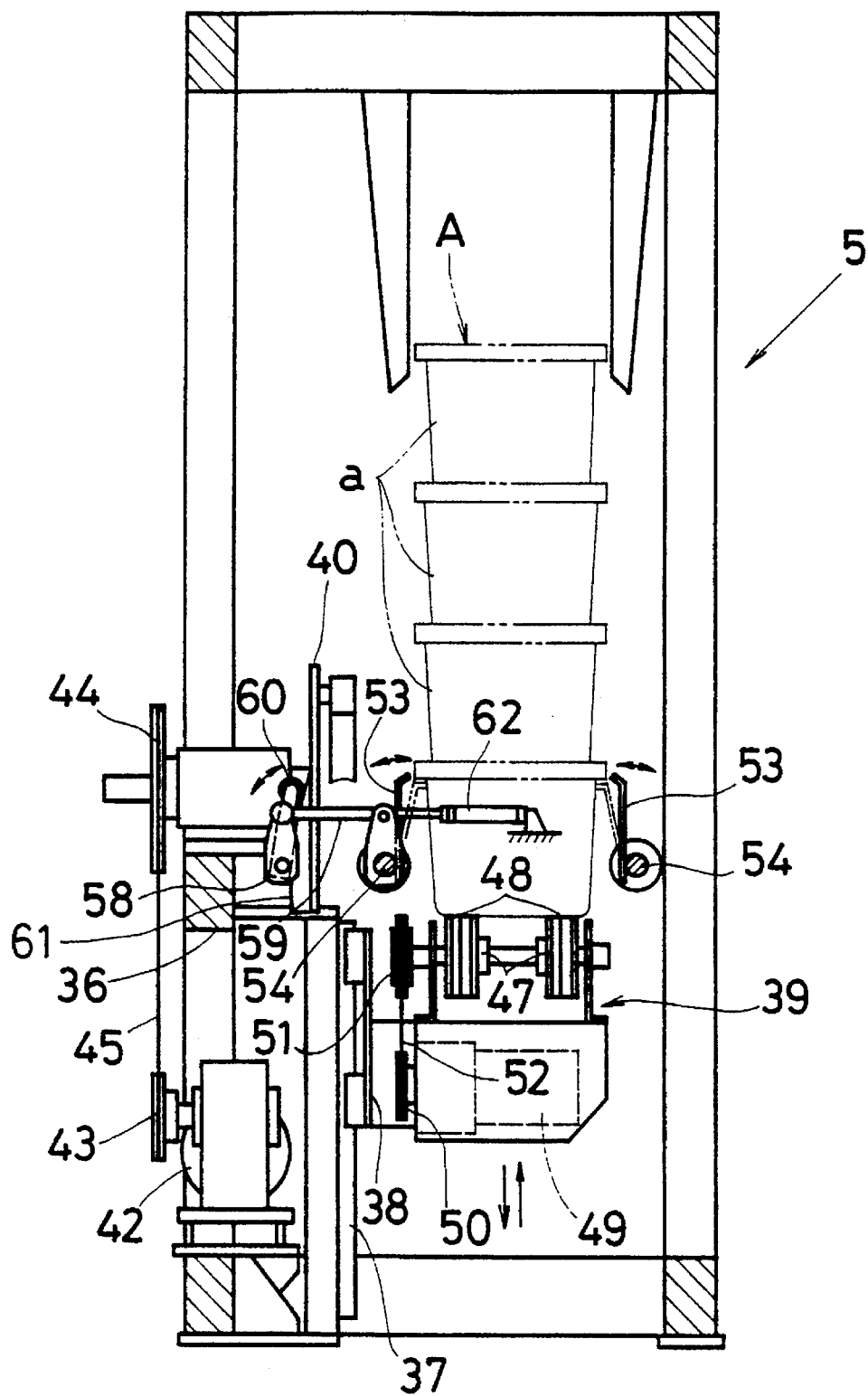
FIG. 9 is a front view showing the conveyor elevating state and case holding state of the case separating machine.
Figure 10:
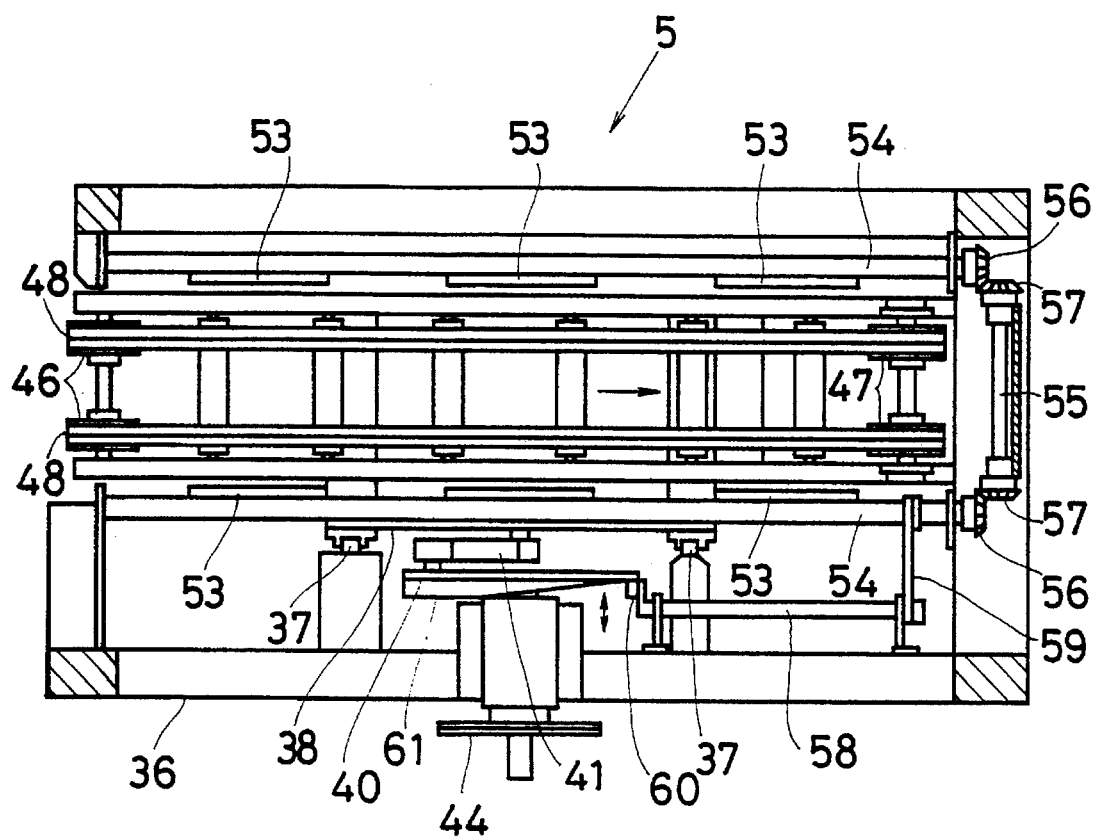
FIG. 10 is a plan view showing the conveyor mounting state of the case separating machine.

Further, one end of the support shaft 54 mounted on one side and one end of the support shaft 58 mounted parallel to the support shaft 54 are coupled together with an arm 59 (see FIG. 9). A cam roller 60 positioned at the other side of the support shaft 58, and a cam 61 formed in the rear peripheral edge of the rotary plate 40, are engaged with each other. The piston rod of a traction cylinder 62 disposed in the finish end is coupled to one end of the support shaft 54. By the operation of the traction cylinder 62, cam roller 60 of the support shaft 58 is always rotated and thrust in the pressing direction (as shown in FIG. 9) to the cam 61 of the rotary plate 40. That is, by rotating the rotary plate 40 by the driving force of the elevating motor 42, through the cam roller 60 and cam 61, the right and left case supporting plates 53,53 are turned to a closing position for holding the cases a of the second layer from the bottom on the elevating conveyor 39, and an opening position for releasing the cases a.

In the thus constituted embodiment, the operation for separating the groups A stacked on pallet P, layer by layer, by the case separating apparatus 1 is described below.

First , as shown in FIGS. 1 and 2, by continuously driving the carrying conveyor 2 in the pallet feed direction, the pallet P having stacked thereon up to 45 cases a is conveyed to the unloading position according to the detection by the photo sensors S1, S2, S3, S4. At the same time, as shown in FIGS. 3,4, by driving the case supporting machine 3, the case supporting plate 17 is rotated to the vertical position confronting the groups A of the third row stacked on the pallet P, while the case supporting plate 17 is moved and stopped at a close position with a specific bap to the groups A of the third row stacked on the pallet P, thereby supporting the groups A in an upright position.

Figure 6:
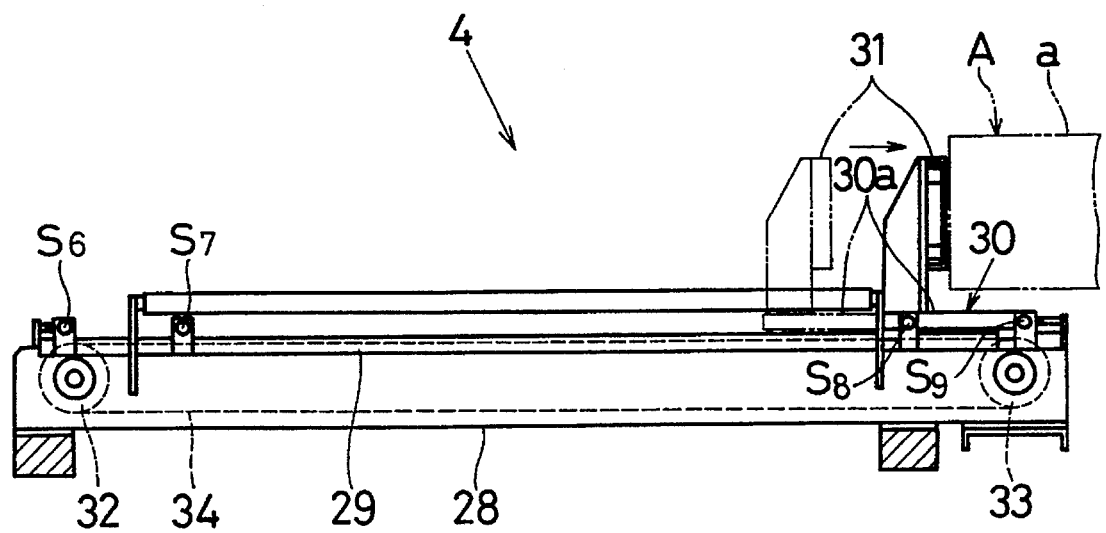
FIG. 6 is a plan view showing the state immediately after end of case unloading by the case unloading machine.

Consequently, as shown in FIGS. 5 and 6, by driving the case unloading machine 4, the groups A of the third row are moved at once in the unloading direction by the pusher plate 31. That is, when unloading the groups A of the first row from the pallet P, the moving motor 35 is rotated at low speed according to the detection signal issued from the photo sensors S6, S7. The moving speed of the pusher plate 31 is reduced, so that the pusher 31 may slowly contact the groups A of the first row, and the groups A are moved together in the unloading direction by the pusher plate 31, so that impact and noise otherwise caused at the time of contact between groups A and pusher 31 is reduced.

Next, when moving the groups A of the first row from the unloading start postion to the unloading end position, the moving motor 35 is rotated at high speed according to the detection signal issued from the photo sensors S7,S8 to accelerate the moving speed of the pusher plate 31, and groups A are moved quickly in the unloading direction by the pusher plate 31, thereby shortening the moving time required for unloading the groups A.

Then, as shown in FIG. 7, when moving the groups A of the first row onto the elevating conveyor 39, the moving motor 35 is rotated at low speed according to the detection signal sent from the photo sensors S8, S9 to slow down the moving speed of the pusher plate 31, and the groups A are slowly transferred onto the elevating conveyor 39 by the pusher plate 31 to attenuate the inertial force added at the time of moving. At the same time, by rotating the elevating conveyor 39 of the case separating machine 5 in the unloading direction, and the groups A of the first row are tranferred onto the elevating conveyor 39. Afterwards, by rotating the moving motor 35 at high speed, the pusher plate 31 is returned to the initial position.

Figure 11:
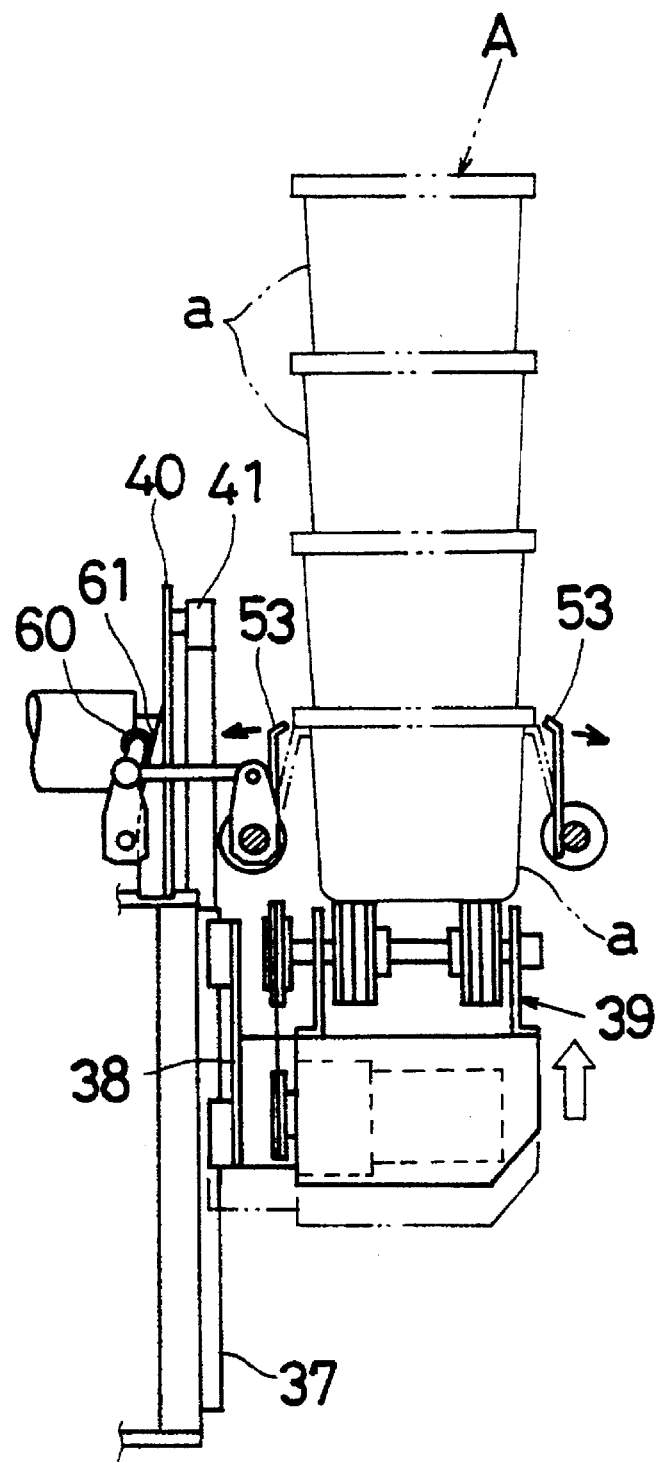
FIG. 11 is a front view showing the case lifting action of the case separating machine.
Figure 12:
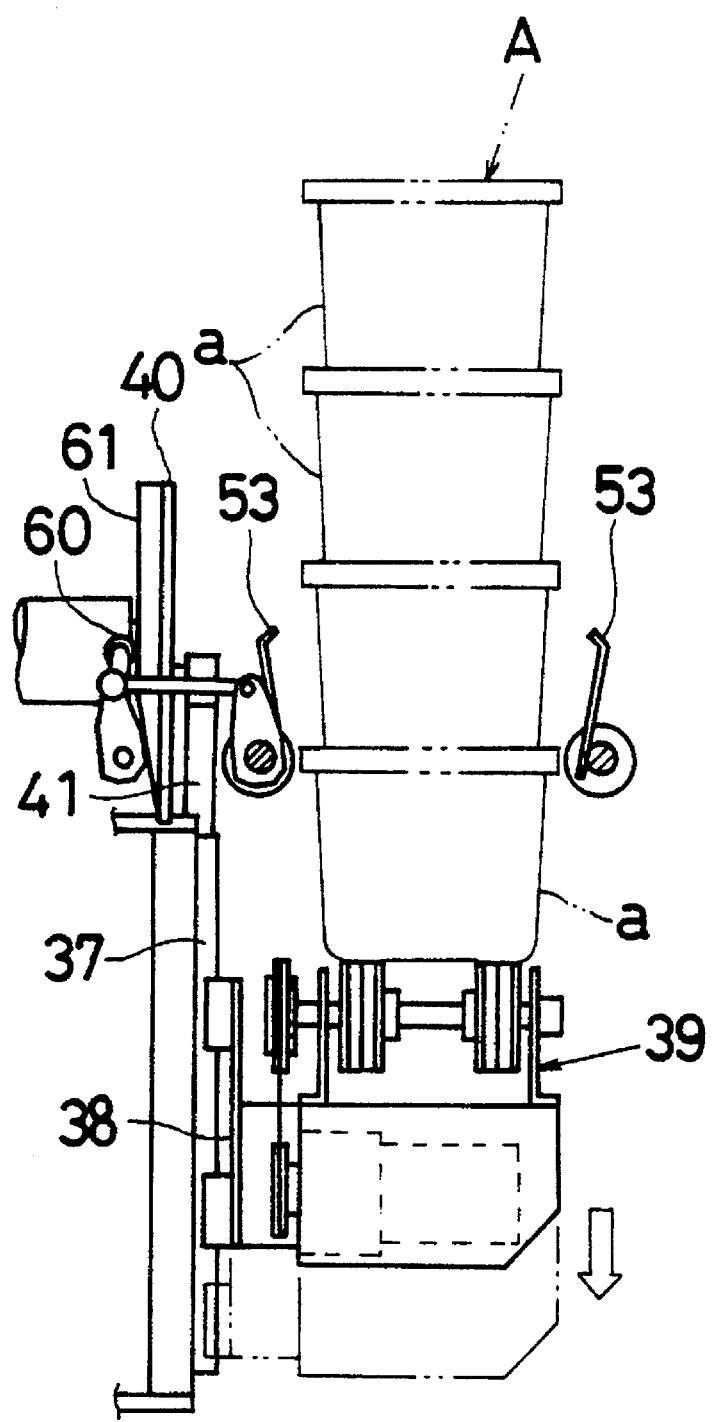
FIG. 12 is a front view showing the case descending action by the case separating machine.

When vertically lowering the elevating conveyor 39 from the case holding position to the case separating position by driving the case separating machine 5, the elevating conveyor 39 is lowered quickly by the crank motion of the crank arm 41 coupled to the rotary plate 40, and the groups A of one row are vertically lowered to the state of being mounted on the elevating conveyor 39. At the same time, as shown in FIGS. 11 and 12, the cam 61 and cam roller 60 formed in the rotary plate are coupled until the cases a stacked on the second layer from the bottom on the elevating conveyor 39 are lowered to the height position held by the right and left supporting plates 53,53, thereby rotating and stopping the right and left case supporing plates fixed on the support shafts 54,54 at the opening position.

Figure 13:
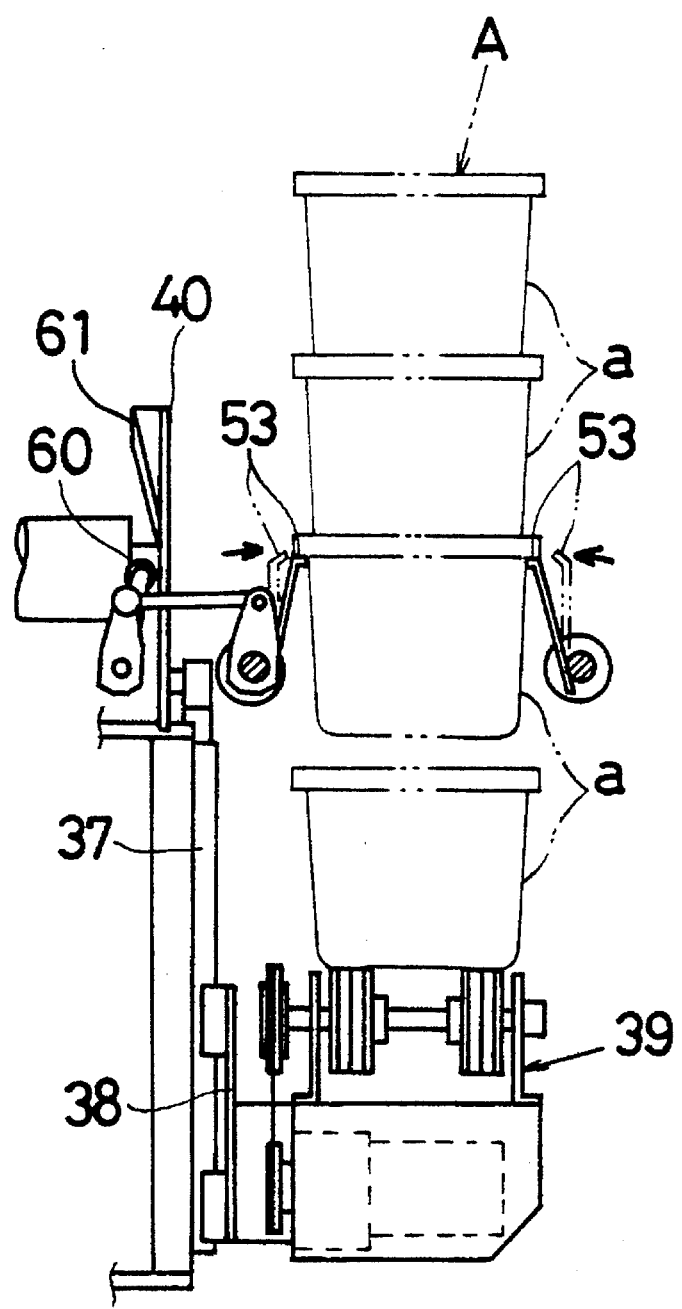
FIG. 13 is a front view showing the case separating state and the case holding state of the case separating machine.

Just before reaching the case separating postion, by slowing down the descending speed of the elevating conveyor 39, the gravity force applied to the groups A of one row is attenuated. Simultaneously, as shown in FIG. 13 cam 61 and cam roller 60 formed in the roatary plate 40 are disengaged and the right and left case supporting plates 53,53 fixed on the support shafts 54,54 are turned in the closing direction, while the right and left case supporting plates 53, 53 are stopped in the cases a stacked on the second layer from the bottom on the elevating conveyor 39, thereby holding the groups A in the remaining upper side in the upright positioni by the right and left case supporting plates 53,53.

Figure 8:
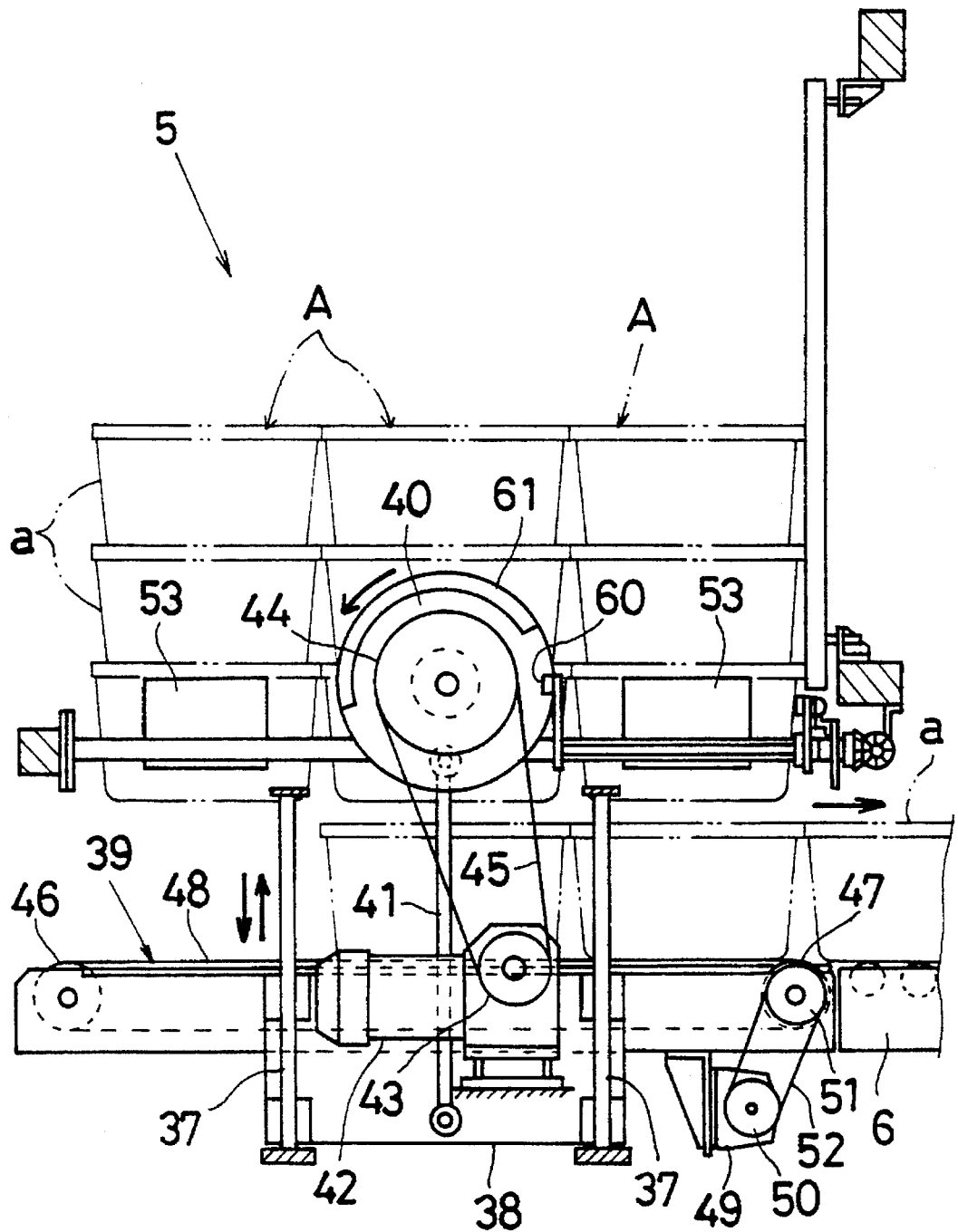
FIG. 8 is a side view showing the conveyor descending stop state of the case separating machine.

The cases a of one row are vertically lowered in the state of being mounted on the elevating conveyor 39, and , as shown in FIG. 8, the elevating conveyor 39 is slowly lowered and stopped at the height positioned parallel to the distributing conveyor 6 at the lower side, and the cases a of the bottom layer mounted on the elevating conveyor 39 are separated to reduce the impact and noise occurring at the time of separation. Afterwards, by rotating and driving the elevating conveyor 39 in the unloading direction, the separating cases a in the bottom layer are sequentially transferred onto the distributing conveyor 6, and conveyed to the next step (not shown).

When raising the elevating conveyor 39 vertically from the case separating position to the case holding position on the other hand, the elevating conveyor 39 is raised fast by the crank motion of the crank arm 41 coupled with the rotary plate 40. At the same time, just before reaching the case holding position, by slowing down the ascending speed of the elevating conveyor 39, the elevating conveyor 39 is caused to contact slowly with the cases a of the bottom layer held by the right and left case supporting plates 53,53 and the groups A of the remaining upper layer side held by the right and left case supporting plates 53,53 are lifted by the elevating conveyor 39, thereby reducing the impact and noise occurring at the time of contact between groups A and elevating conveyor 39.

At the same time, as shown in FIG. 11, by engaging the cam 61 and cam roller 60 formed on the rotary plate 40, the right and left case supporting plates 53,53 fixed on the support shafgs 54,54 are rotated in the opening direction, and the right and left case supporting plates 53,53 are separated at a proper interval for the remaining, cases a mounted on the elevating conveyor 39. Afterwards, similarly, remaing groups A mounted on the elevating conveyor 39 are sequentially separated from the lower layer side, and the separated cases a of the bottom layer are sequentially transferred onto the distributing conveyor 6, and conveyed and supplied to the next step (not shown).

After separating the groups A of the first row, the carrying conveyor 2 and case supporting machine 3 are driven synchronously according to the detection by the photo sensors S1, S2, S3, S4 and the groups A of the second to fifth rows stacked on pallet P are fed intermittently while being held in the upright position by the case supporting plate 17. Moreover, by driving the case unloading machine, the groups A of the second to fifth rows stacked on pallet P are sequentially unloaded row by row, and the case separating machine 5 is driven, and the groups A of the second to fifth rows are sequentially separated from the bottom layer side, and the separated cases a of the bottom layer are sequentially transferred onto the distributing conveyor 6 are conveyed and supplied into the next step (not shown).

After completion of unloading of groups A stacked on one pallet P, the case supporting plate 17 of the case supporting machine 3 is rotated and returned to the horizontal position to be set back to the intial position and the carrying conveyor 2 is driven in the pallet feed direction, and an empty pallet P is conveyed to the recovery process (not shown), and the next pallet P is conveyed to the unloading position, thereby continuously unloading and separating the groups A stacked on the pallet P.

In this way, by vertically ascending and descending the elevating conveyor 39 of the case separating machine 5 by the crank motion of the crank arm 41, the elevating speed of the elevating conveyor 39 is reduced in each region of the case holding position and case separating position. Thus, when descending and stopping, the cases a of the bottom layer stacked on the elevating conveyor 39 are prevented from bouncing, and the impact and noise caused at the time of contact between the groups A of the remaining upper layer and the elevating conveyor 39 are reduced, thereby preventing damage to the commercial value of the contents in the cases a.

Moreover, since groups A of the third row stacked on the pallet P are fed intermittently while held in an upright position by case supporting plate 17, when driving or stopping the carrying conveyor 2, irregular movement of the groups A stacked on pallet P, and deformation of the stacking positioin of group A is prevented, so that the groups A of three rows can be unloaded smoothly row by row.

Since the speed is slowed when the pusher plate 31 contacts or departs from groups A of one row, the impact and noise caused at the time of contact of groups A and pusher plate 31 are reduced, and the inertial force applied when unloading groups A of one row is attenuated, so that groups A of one row can be stopped at a specified position on elevating conveyor 39, thereby separating the groups A securely.

Figure 14:
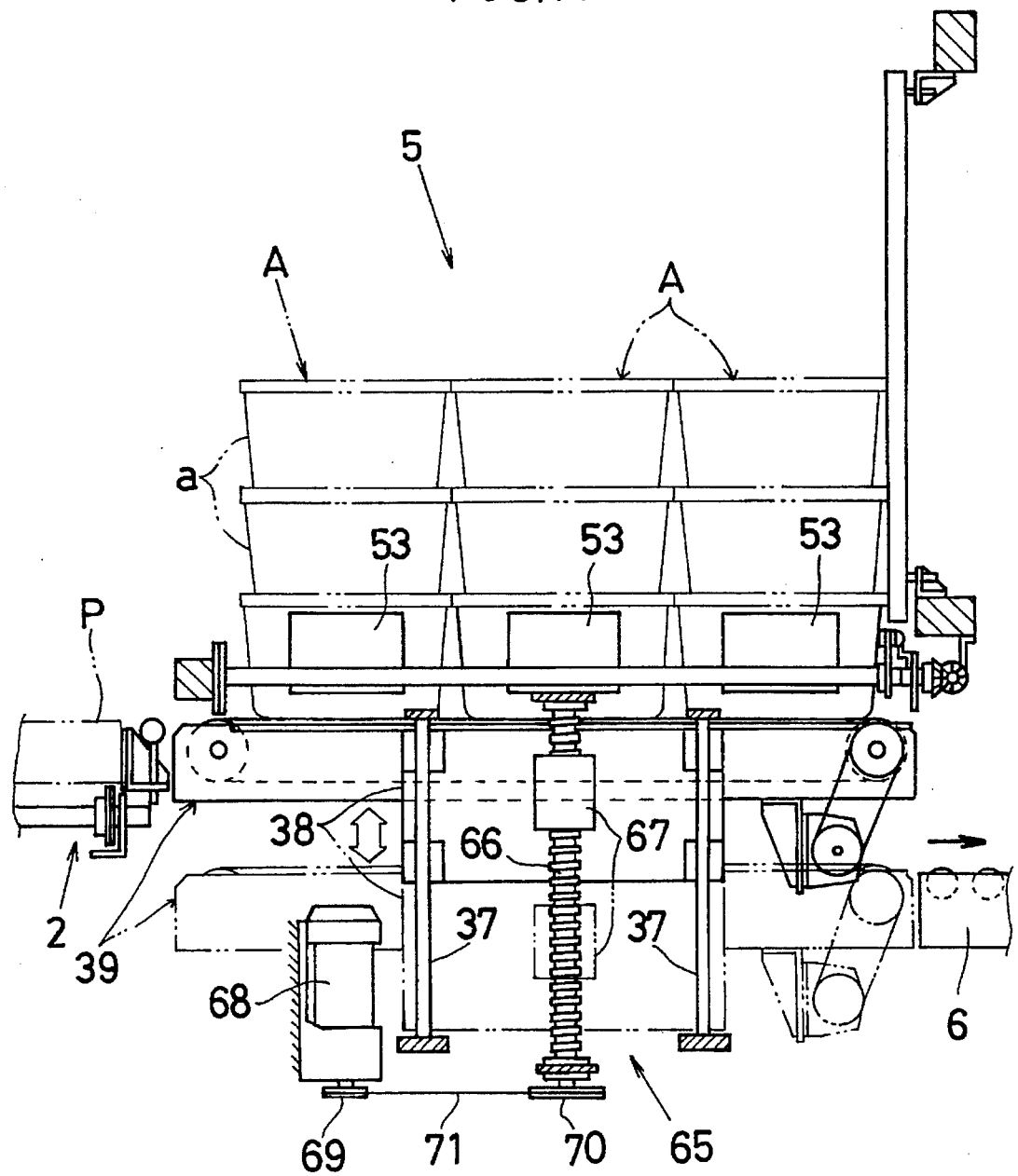
FIG. 14 is side view showing the elevating action of the elevating conveyor by a ball screw mechanism of a second illustrative embodiment.

FIG. 14 shows a case separating machine 5 of a second illustrative embodiment for vertically ascending and descending the elevating conveyor 39 by a ball screw mechanism 65. The machine stretches a ball screw 66 in the vertical direction in the middle between guide rails 37,37 mounted at one side. A ball nut 67 is engaged with the ball screw and is fixed in the middle of the rear of the elevating table 38. By the driving force of elevating motor 68 which motor 68 and reduction gear are disposed in the lower part of the same side, ball screw 66 is rotated normally and reversebly through sprockets 69,70 and drive chain 71, and the elevating holding position and case separating position.

That is, the speed is lowered when the elevating conveyor 39 moves up and down in the regions of the case holding position and case separating position,and the speed is accelerated when the elevating conveyor 39 ascends and descends in the intermediate region between the case holding position and the case separating position. Thus, in the same manner as in the first embodiment, the noise and impact occurring at the time of separating the groups A of one row are reduced, thereby preventing reduction of the commercial value of the contents in cases a.

Figure 15:
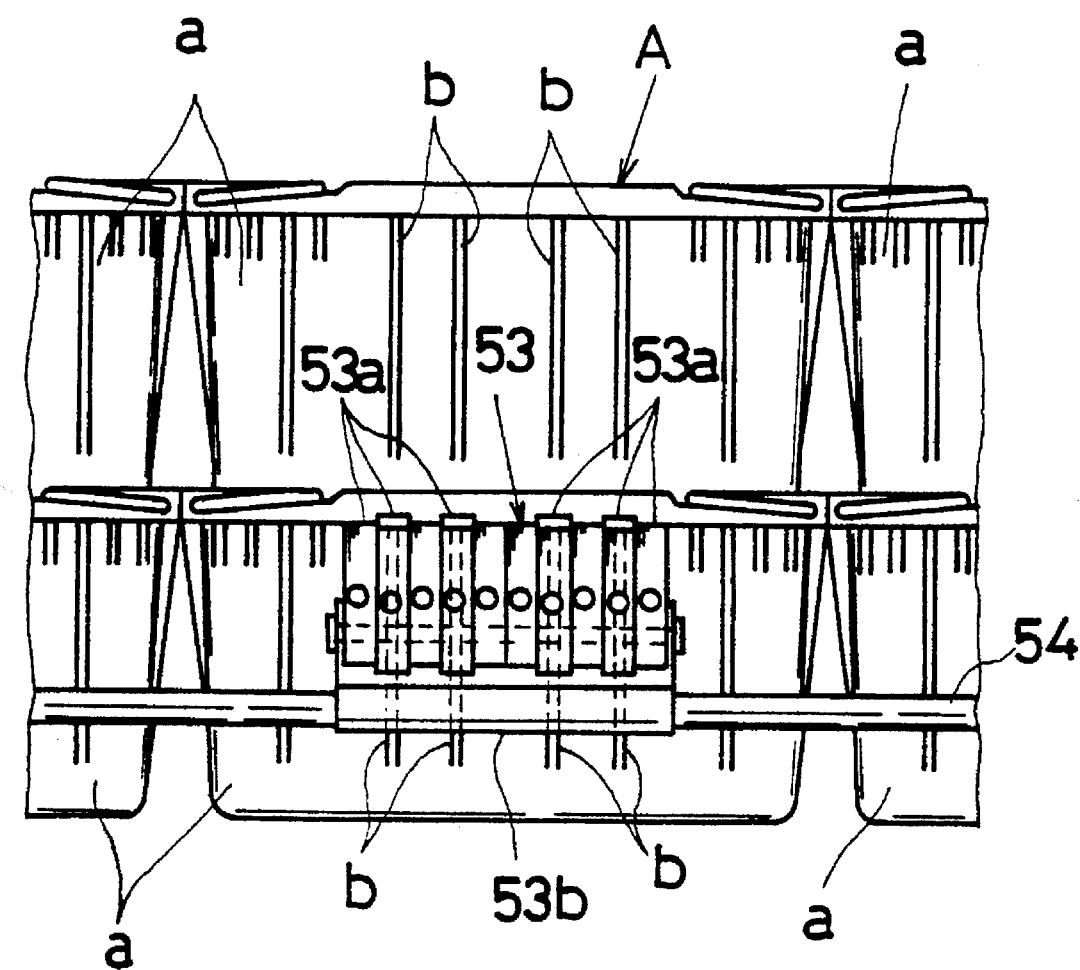
FIG. 15 is a side view showing a case holding state of each separated case holding plate of a third illustrative embodiment.
Figure 16:
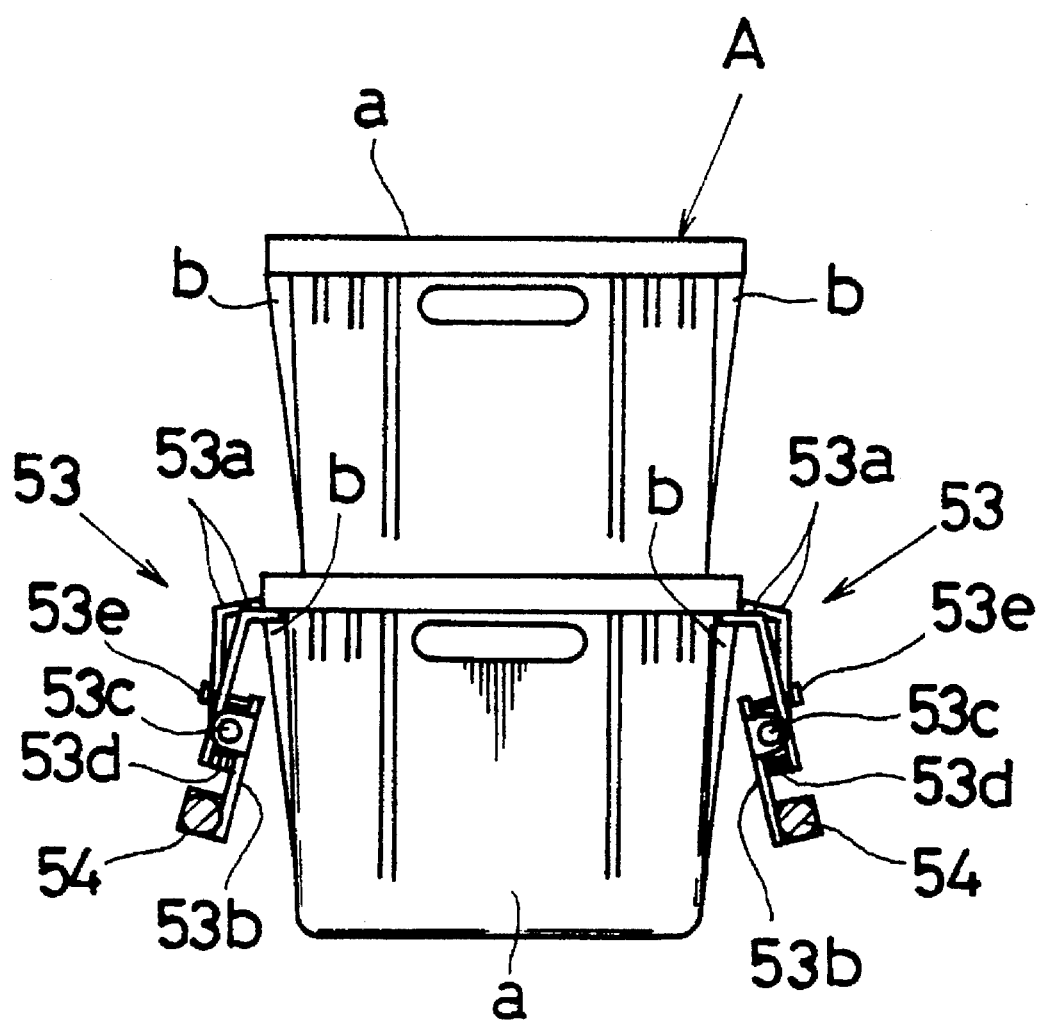
FIG. 16 is a front view showing the case holding state.

FIG. 15 and 16 show a case separating machine 5 of a third illustrative embodiment for holding case supporting plates 53,53 in keyboard form in an upright position and being stopped at the cases a stacked in the second layer from the bottom on elevating conveyor 39. This machine has movable plates 53b,53b fixed on support shafts 54,54 mounted on right and left sides, and then stopping claws 53a arranged in keyboard form on the support shafts 53c,53c mounted at the rear upper end of movable plates 53b,53b,in such a manner as to be free to move laterally. The right and left stopping claws 53a are formed by folding a proper angle so as to be stopped on both side edges of cases a stacked in the second layer from the bottom on elevating conveyor 39.

In addition, by compressing and loading coil springs 53d in the confronting surfaces of the lower end between the stopping claws 53a and movable plates 53b, 53b, the right and left stopping claws 53a are rotated and thrust in the direction to be stopped on both sides of cases a stacked in the second layer from the bottom on elevating conveyor 39, while adjusting screws 53e engaged with the stopping claws 53a are abutted against the upper end of the rear of movable plates 53b,53b, thereby defining the rotation of the right and left stopping claws 53a at a proper stopping angle to both side edges of cases a stacked in the second layer from the bottom on elevating conveyor 39.

More specifically, at both sides of cases a stacked in the second layer from the bottom on the elevating conveyor 39, if a plurality of ribs b are projecting, when the right and left case supporting plates 53,53 are pressed against both sides of cases a, the stopping claws 53a for composing both case supporting plates 53, 53 and the ribs b formed at both sides of case a aubt against each other, and the stopping claws 53a abutting against ribs b are pushed back in the disengaging direction, resisting the thrusting force of coil springs 53d and the remaining stopping claws 53a not abutting against ribs b are stopped at both side edges of the case a. Thus, in the same manner as in the first embodiment, the remaining groups A of the upper layer,except for cases a of the bottom layer, mounted on elevating conveyor 39 can be securely held by the right and left case supporting plates 53,53.

Moreover, if the stopping position of the groups A stacked on elevating conveyor 39 is deviated, the stopping claws 53a for composing the right and left case supporting plates 53,53 are displaced independently, corresponding to the side shape of the case a,so that the right and left case supporting plates 53,53 are stopped securely at both side edges of case a. Thus, in the same manner as above, the remaining groups A of the upper layer,except cases a in the bottom layer stacked on elevating conveyor 39 can be securely held by the right and left case supporting plates 53,53.

I claim:

1. In a case separating apparatus for separating a case from a plurality of groups of cases, each group comprising a plurality of cases stacked on top of each other in layers on a pallet, said group of cases being arranged in rows and columns; said apparatus comprising, carrying conveyor means for carrying said pallet having said plurality of groups of cases arranged thereon in rows and columns;

supporting means for supporting each group of cases in an upright position;

unloading means for unloading a row at a time of said groups of cases from said carrying conveyor means; and separating means for separating a bottom most case from each group of cases in each row; the improvement comprising said separating means comprising an elevating conveyor means for holding a row of groups of cases after unloading by said unloading means, said elevating conveyor means being moved vertically to a holding position and a separating position, said holding position being when said unloading means unloads said row of groups of cases, and said separating position being when said case is removed from the bottom most layer, means for reducing the vertical speed of said elevating conveyor means when said elevating conveyor means is in the region of said holding position and said separating position, and means for accelerating said vertical speed when said elevating conveyor means is between said holding position and said separating position.

2. The apparatus of claim 1, wherein said supporting means comprises supporting plates for supporting a final row of cases at positions confronting the final row of cases stacked on said carrying conveyor means, and plate moving means for moving said supporting plate while in contact with said final row of cases in synchronism with the feed speed of said carrying conveyor means.

3. The apparatus of claim 1, wherein said unloading means comprising a pusher means for pushing one row of cases in an unloading direction to a position confronting cases of one row stacked on said carrying conveyor means, and pusher moving means for slowing down moving speed of said pusher means just before said carrying conveyor means reaches an unloading position and just before a row of groups of cases is unloaded, and for accelerating said moving speed of said pusher means when moving between said two positions.

4. The apparatus of claim 1, wherein said supporting means comprises a plurality of holding claws for independently separating a particular case in response to the side shape of said particular case.

5. The apparatus of claim 1, wherein said supporting means comprises a plurality of holding claws, moving means for moving said plurality of holding claws between a closing position at which said plurality of holding claws are engaged against opposite edges of a case disposed at a separating position, and an opening position at which said plurality of holding claws are disengaged from said edges of said case; and means for controlling the opening and closing action of the plurality of holding claws with the vertical movement of said elevating conveyor means.

* * * * *